Patented Oct. 10, 1933

1,929,441

UNITED STATES PATENT OFFICE 1,929,441

PROCESS FOR OBTAINING ORTHOPHOSPHORIC ACID AND/OR CONVERSION PRODUCT THEREOF

Charles H. Milligan, Newark, N. J., assignor to The American Agricultural Chemical Company, a corporation of Delaware No Drawing. Application August 26, 1930
Serial No. 477,982

3 Claims. (Cl. 23—165)

My invention is applicable generally to the recovery of phosphoric compounds from materials containing inorganic phosphates and/or acid phosphates. Suitable materials are; animal bone matter, deposits containing recent or fossil bone matter, mineral deposits containing phosphates of any kind, such as apatite, and artificial materials, such as superphosphates.

The first step in my process consists in treating the raw material with sulphuric acid of a concentration appropriate to replace and liberate the combined phosphoric acid with the resultant formation of free phosphoric acid. While I may employ any concentration of sulphuric acid which will accomplish this purpose, I find acid of from 25 to 93%, $H_2SO_4$ content, to be effective, and prefer acid of from 50 to 80%, $H_2SO_4$ content, for example 75%. The amount of acid to be applied must be sufficient to form orthophosphoric acid, and for maximum recovery should be sufficient to convert the major part of the combined phosphoric acid to this form. An excess of sulphuric acid over the theoretical may be employed where it is desired to recover substantially all of the combined phosphoric acid present in the raw material. The mixture of acid and raw material is preferably denned to complete the reaction.

When a sulphuric acid of this strength is admixed with a raw material of the type described, the result is a pasty mixture of gangue or earthy material carrying the soluble reaction products disseminated throughout the mass, and in a form such that selective separation is difficult. A commercial separation has heretofore been achieved by water extraction with the consequent solution of the soluble phosphates together with the simultaneous removal either in suspension or solution of substantial proportions of other materials present in the ore, or formed by the acid reaction. In accordance with my process, the mixture of gangue or earthy material carrying soluble reaction products is extracted by the use of an extraction liquid consisting predominantly of an organic component or components in which phosphoric acid is soluble. A more effective separation may be achieved by dissolving the soluble phosphoric acid from the other materials present through the use of solvents containing an organic component.

Favorable results may be obtained from the use of the alcohols, primary, secondary or tertiary of not exceeding 8 carbon atoms in the chain carrying the hydroxyl group. Such alcohols may be hereinafter generically referred to as "aliphatic mono hydroxyl alcohols of not exceeding 8 carbon atoms in the chain carrying the hydroxyl group."

A liquid solution containing butyl alcohol, preferably consisting predominantly of this material, has been found very effective. The term "butyl alcohol" as herein employed, shall denote any of the pure butyl alcohols or any mixture of the isomeric butyl alcohols. With the alcohols I prefer to employ those of not less than 3 carbon atoms to the molecule.

The solution employed for extraction purposes preferably consists predominantly of one or more of the selected organic substances. For the maximum purity of product, the organic material should predominate.

I further find it of advantage to limit the amount of extraction liquid so that it does not exceed five times the weight of the material with which it is contacted, viz, of the raw material plus the reaction products of the sulphuric acid treatment. By limiting the amount of extraction liquid in this manner, the extraction of phosphoric acid may be incomplete and it may be desirable to subsequently wash the undissolved material with water for the separation of an additional quantity of phosphoric material of lesser purity. However, by so limiting the amount of extraction liquid applied, it is possible to inhibit the solution of other materials than phosphoric acid formed by the action of the sulphuric acid on the raw material, with the result that the dissolved phosphoric acid is of extremely high grade.

The sulphuric acid may be mixed with the raw material in any desired type of mixing apparatus, and the extraction liquid may be incorporated with the products of the reaction in any suitable type of mixing apparatus. The extraction liquid may be thereafter separated from the residue of undissolved material by settling and decanting, by filtration, centrifuging or any other suitable procedure. After separation of the extraction liquid, the last traces may be removed by steaming. The undissolved material may be thereafter washed with water for the separation of an additional quantity of phosphoric material of lesser purity.

I have found, however, that where the sulphuric acid applied to the phosphate containing material is theoretically sufficient to combine with the bases present, either free or combined with other acids than sulphuric oxide, the extraction liquid separates a phosphoric acid which is relatively free from materials other than phosphoric acid formed by the action of the sulphuric acid on the raw material, but may contain sulphuric acid which is difficult to selectively eliminate from the extraction liquid. I have further found that by limiting the amount of inorganic acid so that it is less than theoretically necessary to combine with the bases present, either free or combined with other acids than sulphuric oxide, the extraction liquid may be caused to separate a relatively pure phosphoric acid free from the applied sulphuric acid. Any reduction from the theoretical will prove beneficial, and by a relatively slight reduction the extraction liquid may be caused to extract a phosphoric acid which is either free from the inorganic acid or in which the sulphuric acid is present in amount so small as not to be detectable by the usual analytical methods.

In order to produce a satisfactory yield of phosphoric acid, the sulphuric acid should be applied in amounts approaching the theoretical. The formation of phosphoric acid from a raw material containing neutral phosphates, for example, may be assisted by the addition of sulphuric acid sufficient to combine even with relatively weak bases which are simultaneously present. Where sulphuric acid is employed the mixture is preferably denned at a temperature in excess of 75° C., for a period of several hours, to permit the reaction to proceed, and during this stage volatile acids may be generated and thrown off by the action of the sulphuric acid on salts of volatile acids which are present in the raw material. For these reasons the amount of sulphuric acid applied should approach that theoretically necessary to combine with the bases present, either free or combined with other acids than sulphuric oxide. The exact reduction from the theoretical necessary to yield a phosphoric acid of the desired purity may, in this case, be determined by a series of preliminary tests in which various amounts of sulphuric acid less than the theoretical are mixed with test batches of the raw material. Such batches should be held at a temperature of at least 75° C. for several hours, and thereafter extracted with an extraction liquid of the type hereinbefore described. By analytical tests applied to the material so extracted, it may be easily determined when the desired freedom from sulphuric acid has been achieved, and the same relative proportion of sulphuric acid may then be applied industrially with the consequent recovery of phosphoric acid of corresponding relative purity.

Various methods may be employed for recovering phosphoric acid or conversion products thereof from the extraction liquid.

Where the phosphoric acid is left in the free state the organic component may be separated by distillation, although decomposition may result from the dehydrating effect of the phosphoric acid. For example, where an alcohol is employed, the distillate may contain quantities of olefine material which may be separated therefrom, for example, by rectification, and the olefine material may either be utilized as such, or reconverted to alcohol by appropriate treatment.

It is also feasible to either completely neutralize the phosphoric acid, employing, for example, sodium carbonate, and/or sodium hydroxide, or to carry the neutralization to the point at which little or no free orthophosphoric acid is left. This neutralization may, for example, be carried to the point at which the orthophosphoric acid is completely converted to tri-sodium phosphate, or may only be carried to the point at which the material is converted to mono sodium phosphate. If the anhydrous salt is required, the extraction liquid may be then distilled to dryness; whereas if an aqueous solution is desired, the distillation may be carried only to the point of removing the organic component of the extraction liquid. Crystallization may alternatively be employed to separate the dissolved phosphoric compound, and in this case the orthophosphoric acid in the extraction liquid may be neutralized with ammonia.

It is also feasible to neutralize the orthophosphoric acid with a base producing a salt, which separates from the extraction liquid by precipitation, and thereafter to recover the extraction liquid by decantation or filtration. Where the solution is principally aqueous, it may be necessary to convert the phosphoric acid into a water insoluble salt in order to separate the phosphoric acid content by precipitation. Where, however, the extraction liquid consists largely of organic material, as for example where it contains in excess of 25% thereof, and particularly where it consists predominantly of organic material, it is only necessary to convert the phosphoric acid into a salt which is normally water soluble for this purpose. Precipitation of the phosphoric acid present may be accomplished by converting the phosphoric acid present into a sodium salt, such as mono or di sodium phosphate. I am not limited to the sodium phosphates, but may correspondingly form any alkali metal phosphate. The sodium phosphate, for example, may be formed by adding sodium hydroxide, sodium carbonate or any other suitable basic material, and the sodium salts, or for that matter any desired salts, may be formed by adding the corresponding metallic ion combined with a weak organic acid. The same result may, of course, be obtained by converting the phosphoric acid into salts which are not normally water soluble or are not highly water soluble, such as, for example, mono or di calcium phosphate. It will be apparent in the foregoing that I may separate the phosphoric acid from the extraction liquid by converting it into neutral mono or di phosphates of any inorganic base. The term "phosphates" as herein employed, shall embrace the neutral phosphates and also the acid phosphates.

The foregoing description is for purposes of illustration and not of limitation, and it is therefore my intention that the invention be limited only by the appended claims or their equivalents in which I have endeavored to claim broadly all inherent novelty.

I claim:

1. Process of obtaining phosphoric acid or conversion products thereof from materials containing inorganic phosphates, which comprises admixing a phosphate containing material with sulphuric acid of from 25 to 93%, $H_2SO_4$ content, in quantity sufficient to form orthophosphoric acid, but less than the quantity required to combine with the bases present in the material, either free or combined with other acids than sulphuric acid, thereafter contacting the admixed materials with not exceeding five multiples by weight of an extraction liquid consisting predominantly of an aliphatic mono hydroxyl alcohol of from 3 to 8 carbon atoms in the chain carrying the hydroxyl group, thereafter separating said extraction liquid and dissolved phosphoric acid from undissolved material, and removing said dissolved acid or conversion products thereof from said extraction liquid.

2. Process of obtaining phosphoric acid or conversion products thereof from materials containing inorganic phosphates, which comprises admixing a phosphate containing material of from 25 to 93%, $H_2SO_4$ content, with sulphuric acid in quantity sufficient to form orthophosphoric acid, but less than the quantity required to combine with the bases present in the material, either free or combined with other acids than sulphuric oxide, thereafter contacting the admixed materials with not exceeding five multiples by weight of an extraction liquid consisting predominantly of butyl alcohol, thereafter separating said extraction liquid and dissolved phosphoric acid from undissolved material, and removing said dissolved acid or conversion products thereof from said extraction liquid.

3. Process of obtaining phosphoric acid or conversion products thereof from materials containing inorganic phosphates, which comprises admixing a phosphate containing material with sulphuric acid in quantity sufficient to form orthophosphoric acid, thereafter contacting the admixed materials with not exceeding five multiples by weight of an extraction liquid consisting predominantly of butyl alcohol, thereafter separating said extraction liquid and dissolved phosphoric acid from undissolved material and removing the dissolved phosphoric acid or conversion products thereof from said extraction liquid.

CHARLES H. MILLIGAN.